United States Patent
Martin et al.

(10) Patent No.: US 8,626,142 B2
(45) Date of Patent: Jan. 7, 2014

(54) SYSTEM AND METHOD FOR PERFORMING A LIGHT WEIGHT, WIRELESS ACTIVATION OF A MOBILE COMMUNICATION DEVICE

(75) Inventors: Daryl Martin, Paradise (CA); James Andrew Godfrey, Waterloo (CA); John Ferguson Wilson, Waterloo (CA)

(73) Assignee: BlackBerry Limited, Waterloo (CA)

( * ) Notice: Subject to any disclaimer, the term of this patent is extended or adjusted under 35 U.S.C. 154(b) by 687 days.

(21) Appl. No.: 12/790,145

(22) Filed: May 28, 2010

(65) Prior Publication Data

US 2011/0294484 A1    Dec. 1, 2011

(51) Int. Cl.
*H04M 3/00* (2006.01)
*H04M 1/66* (2006.01)
*H04M 1/68* (2006.01)
*H04M 3/16* (2006.01)

(52) U.S. Cl.
USPC ............ 455/418; 455/410; 455/411; 455/419

(58) Field of Classification Search
USPC .................................. 455/418–419, 410–411
See application file for complete search history.

(56) References Cited

U.S. PATENT DOCUMENTS

| | | | | |
|---|---|---|---|---|
| 6,600,930 | B1 * | 7/2003 | Sakurai et al. | 455/414.3 |
| 7,127,526 | B1 * | 10/2006 | Duncan et al. | 709/249 |
| 2004/0177270 | A1 * | 9/2004 | Little et al. | 713/200 |
| 2005/0079863 | A1 * | 4/2005 | Macaluso | 455/419 |
| 2010/0197219 | A1 * | 8/2010 | Issa et al. | 455/3.06 |
| 2010/0222048 | A1 * | 9/2010 | Madej et al. | 455/418 |

OTHER PUBLICATIONS

CIPO, Office Action, Application No. 2,741,164, Sep. 10, 2013, 3 pages.

* cited by examiner

*Primary Examiner* — Steven Lim
(74) *Attorney, Agent, or Firm* — The Danamraj Law Group, P.C.

(57) ABSTRACT

A method, mobile device and activation server for wirelessly activating a mobile communication device at an activation server sends an activation summary to the mobile communication device in response to receiving a request for activation. The activation summary provides notification of a number of services that can be activated on the mobile communication device. Responsive to receiving a selection of at least one of the services, the method downloads at least one of configuration information and routing information for the selected service to the mobile communication device.

20 Claims, 5 Drawing Sheets

SYSTEM AND METHOD FOR PERFORMING A LIGHT WEIGHT, WIRELESS ACTIVATION OF A MOBILE COMMUNICATION DEVICE

FIELD OF THE DISCLOSURE

The present patent disclosure generally relates to wireless activation of a mobile communication device in a communication network. More particularly, and not by way of any limitation, the present patent disclosure is directed to allowing wireless activation of a portion of the services and data sources authorized for the user.

BACKGROUND

Activation of a mobile communication device (MCD) on a network refers to a process by which the device is associated with a user who is authorized to access the network. Activation also provides a means by which the network and the mobile communication device exchange the configuration and/or routing information necessary for successful communications. During activation, the network may provide the MCD with access to multiple services, such as email, browsing and calendar management. These services can be provided via applications downloaded to the MCD or by providing the configuration information necessary to access programs or websites available via another network, such as the Internet. The network may also provide synchronization of data on the MCD, e.g. emails and calendar events, with corresponding data available on an associated desktop computer or an associated account on a server or with data associated with one or more of the services. Each of the provided services may require separate configuration and routing information to be exchanged with the mobile communication device. Additionally, each of these services may have associated data sources that are provided to the mobile communication device so that the information available to the user on the MCD is synchronized with the information from other sources. For example, an email application may pre-populate the MCD with data that includes the user's contact list and a given number, i.e., 100, of the most recent emails in the user's mailbox to initially synchronize the mailbox on the MCD with the regular mailbox associated with the user. Similarly, a calendar application may populate the MCD with data that includes calendar items and reminders that are currently on the user's calendar to synchronize the two calendar instances. For a given user, the quantity of configuration information and data downloaded during activation may be substantial.

Activation may be performed over a wired connection, such as a physical connection between the MCD and the user's desktop computer or one or more services or applications, but may also be performed over a wireless connection. From time to time, after a particular MCD has been activated with a user's applications and services, it may be desirable to provide the services and applications on a different MCD. For non-limiting examples, the user may choose to obtain a new MCD or to switch between MCDs, or an activated MCD may be lost or stolen, requiring a replacement MCD. When this occurs, the different or replacement MCD must itself be activated and provided with the same information as the original MCD. When the new or replacement MCD is wirelessly activated, the quantity of information that must be provided to the MCD may cause difficulties, particularly if the MCD is being serviced by a network other than the user's home network, as may occur for example when the user is traveling.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION

Figure 1:
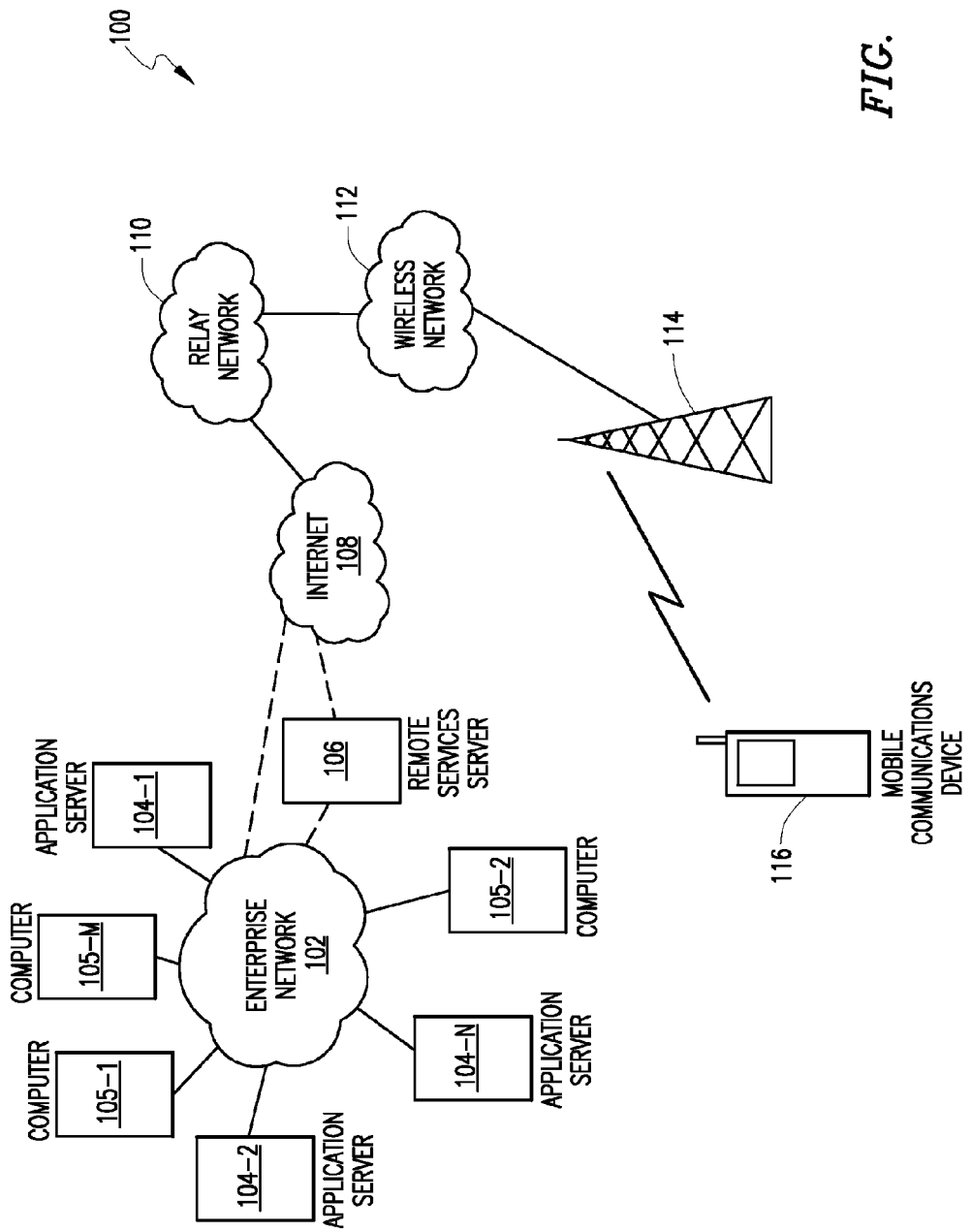
FIG. 1 depicts an example network environment wherein one or more embodiments of the present patent disclosure may be practiced.

The present patent disclosure is broadly directed to limiting the amount of information that is wirelessly transmitted to a mobile communication device when the device is activated. Embodiments are described that provide the user the capability to indicate the specific service(s) and data source(s) that are immediately required, while allowing less urgent services and data sources to be provided at a later time.

The disclosure includes a method for activating a mobile communication device over a wireless interface. When an activation request from a mobile communication device is received at an activation server, the activation server sends a summary of all of the services that can be activated to the mobile communication device. If circumstances are unfavorable for performing the entire activation process, the server may receive a response that indicates the user's desire to activate only a portion of the possible services. Once the response is received, the activation server downloads to the mobile communication device the configuration information and routing information for the desired service(s). The summary may also include the data that is to be downloaded to the MCD and the amount of data, so that the user can also limit the amount of data to be downloaded. In situations where an administrator has set requirements for the activation or where one service depends on the availability of a second service, administrative rules may be applied to ensure that proper actions are applied during the activation.

The disclosure also includes an activation server that can activate a wireless mobile communication device. The activation server contains components that are configured to perform the following actions: sending an activation summary to the mobile communication device after receiving an activation request from the mobile communication device, with the activation summary providing a number of services that can be activated and responsive to receiving an activation response in which at least one service is selected, downloading to the mobile communication device the configuration and routing information for the requested service(s). The activation server may also provide a number of data sources that can be downloaded to the MCD and the user may select one or more of the data sources to download.

The disclosure also includes a computer-accessible medium on which a set of instructions is stored. When the instructions are executed by an activation server, the instructions perform the steps of sending an activation summary to the mobile communication device in response to receiving an activation request from the mobile communication device, with the activation summary including a number of services that can be activated on the mobile communication device, and responsive to receiving an activation response in which at least one service is selected, downloading to the mobile communication device the configuration and routing information for the requested service(s).

The disclosure also includes a method at a wireless mobile communication device for activating the mobile communication device. The MCD sends an activation request to an activation server and receives an activation summary that contains notification of a number of services that can be activated on the mobile communication device. After receiving user input for the services that are to be activated, the MCD sends an activation response in which at least one service is selected. The MCD receives a download of configuration information and routing information for the selected service.

The disclosure also includes a wireless mobile communication device that sends an activation request to an activation server and receives an activation summary that contains notification of a number of services that can be activated on the mobile communication device. After receiving user input for the services that are to be activated, the MCD sends an activation response in which at least one service is selected. The MCD receives a download of configuration information and routing information for the selected service.

The disclosure also includes a computer-accessible medium on which a set of instructions is stored. When a mobile communication device executes the instructions, the MCD performs the steps of sending an activation request to an activation server and receiving an activation summary that contains notification of a number of services that can be activated on the mobile communication device. After receiving user input for the services that are to be activated, the MCD sends an activation response in which at least one service is selected. The MCD receives a download of configuration information and routing information for the selected service.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an example network environment 100 including a wireless network 112 wherein an embodiment of the present patent application may be practiced. Wireless network 112 may be implemented, for example, as a wireless packet data service network, but other types of wireless networks could also be used, as will be further described herein. A network 102, which may be a packet-switched network, can include one or more geographic sites and be organized as a local area network (LAN), wide area network (WAN), metropolitan area network (MAN), et cetera, for serving a plurality of users. Network 102 can be an enterprise network, an Internet service provider (ISP) network, application service provider (ASP) network, etc. A number of application servers 104-1 through 104-N disposed as part of network 102 are operable to provide or effectuate a host of internal and external services such as email, video mail, Internet access, corporate data access, messaging, calendaring and scheduling, information management, and the like. Application servers 104-1 through 104-N are also operable to provide administrative functions, such as determining a level of access provided to each user, encryption of information sent between the network and an associated mobile communication device and activation of a mobile communication device on the network. These administrative functions may be disposed in a single application server, e.g., any of servers 104-1 through 104-N, or the administrative functions may be distributed on a plurality of servers throughout the network. In one or more embodiments, the servers having administrative functions may be part of a corporate network and may manage activation of MCDs associated with corporate employees. In one or more embodiments, an Internet Service Provider (ISP) or an Application Service Provider (ASP) that provides services to the general public and manages activation of MCDs associated with clients of the ISP or ASP may operated the servers having administrative functions.

Similarly, a number of information appliances, such as desktop computers, laptop computers, servers and workstations, disposed as part of network 102 are operable to access service applications, hosted either internally or externally. Reference numerals 105-1 through 105-M refer to such appliances in one implementation.

Additionally, a remote services server 106 may be interfaced with network 102 for enabling a user to access or effectuate any of the services, e.g., from a remote location, using a suitable MCD 116. The MCD 116 is typically served by wireless network 112 and one or more base stations 114 thereof, only one of which is shown. Depending on the wireless network technology used, the base station 114 may for example be a base station of a traditional cellular-type wireless network or a packet or data overlay thereof, a WLAN wireless access point, or another type of radio transmitting and receiving facility. In some implementations, the wireless network 112 may be an element of or integrated with network 102. In other implementations, the wireless network 112 may be external to network 102, and may be realized as, for example, a carrier-operated cellular-type wireless network or a packet or data overlay thereof, a WLAN access point, or some other wireless network facility. The wireless network 112 may interface with network 102 directly, or via one or more shared or non-shared external facilities, which may include IP-based packet networks such as the public Internet 108, a relay network 110, or other networks (not shown). The remote services server 106 may optionally serve as an intermediary between network 102 and external networks. Accordingly, the paths between network 102 and an external network are illustratively shown in dashed lines, one of which may involve the remote services server 106.

A secure communication link with end-to-end encryption between an element of network 102 (for example, but without limitation, remote services server 106) and the MCD 116 may be established. The secure communications link may be mediated through any external networks, such as the public Internet 108, wireless network 112, and any other intermediaries. In one embodiment, a trusted relay network 110 may be disposed between the Internet 108 and the infrastructure of wireless network 112. In another embodiment, the infrastructure of the trusted relay network 110 may be integrated with the wireless network 112, whereby the functionality of the relay infrastructure may be consolidated as a separate layer within a "one-network" environment. Additionally, by way of example, MCD 116 may be a data-enabled mobile handheld device capable of receiving and sending messages, web browsing, interfacing with corporate application servers, et cetera, regardless of the relationship between the networks 110 and 112.

The wireless network 112 may be implemented in any known or heretofore-unknown mobile communications technologies and network protocols, as long as a data service is available therein for transmitting information. For instance, the wireless network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, any 2nd-, 2.5-, 3rd-, 4th, or subsequent Generation networks, a WLAN network employing WIFI or WIMAX technologies, or any other suitable wireless network. As will be seen herein below, the embodiments of the present patent application for wirelessly activating MCD 116 will be described regardless of any particular wireless network implementation.

Figure 2:
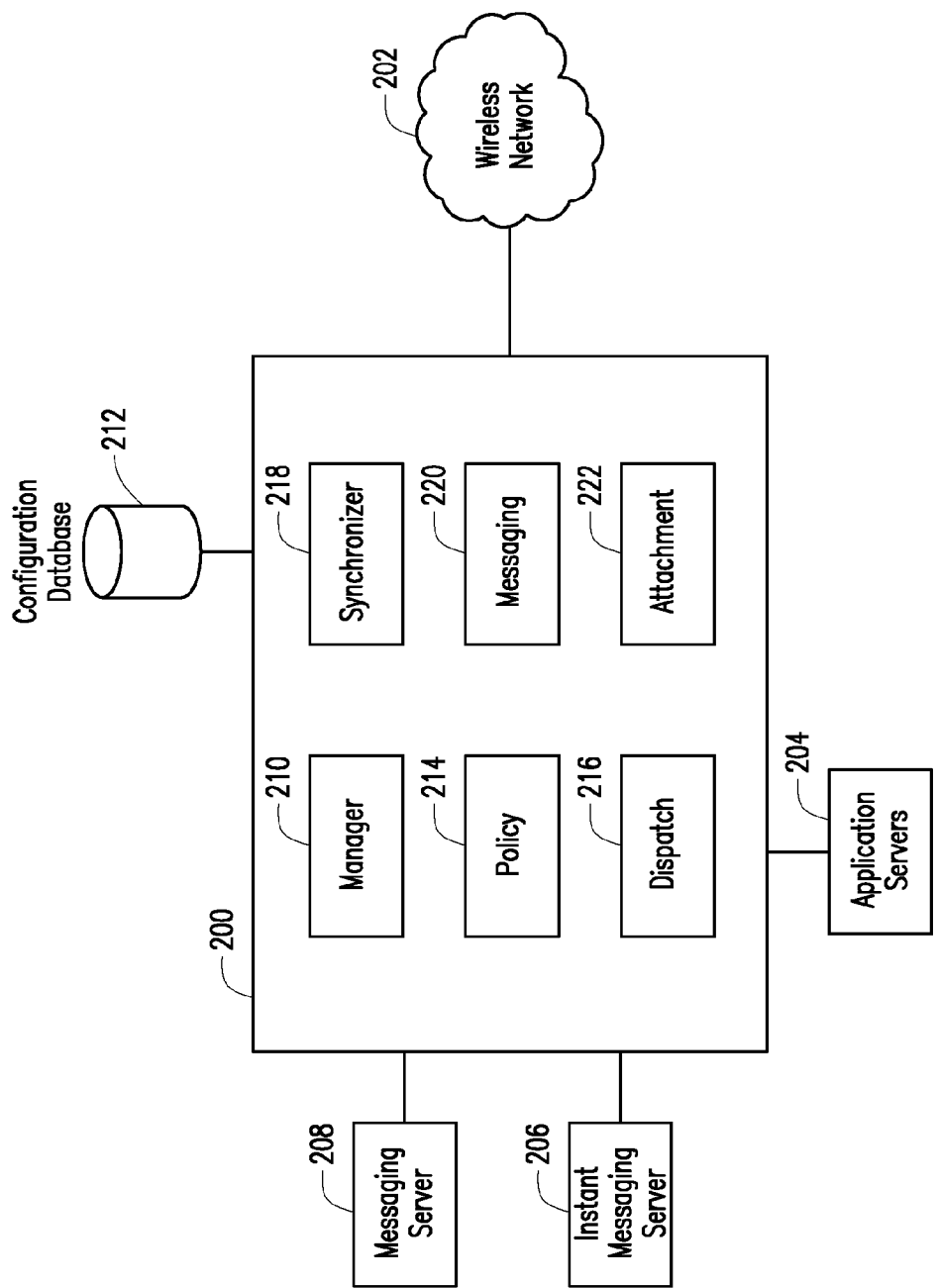
FIG. 2 depicts an example activation server wherein one or more embodiments of the present patent disclosure may be practiced.

Referring now to FIG. 2, depicted in greater detail therein is an example activation server 200 at which an embodiment of the present patent application may be practiced. Activation server 200 is configured to provide activation of mobile communication devices, so that the MCDs are able to access services offered through an associated network, such as network 102 in FIG. 1. In at least one embodiment, activation server 200 is part of a corporate network in which activation enables an MCD to access services on that network, such as the user's corporate mail account, calendar application, contact list and other corporate data. In at least one embodiment, activation server 200 is associated with an Internet Service Provider (ISP) or Application Service Provider (ASP) in which activation enables an MCD to access a user mailbox on the ISP or ASP, and may also enable the MCD to access other services offered by the ISP or ASP, which services may be included in a suite of services furnished to the user by the ISP or ASP. Activation server 200 is in communication with associated MCDs via wireless network 202. Wireless network 202 may be part of a public or private network that includes activation server 200 or may be connected to activation server 200 via the Internet, either directly or via a remote services server (neither of which are shown). Other connections may be, for example, to one or more content or application servers 204 for the network, instant messaging server 206 and messaging server 208. Other types of content and applications servers, and connections thereto, may also be provided.

Activation server 200 contains a number of components, each enabling specific services and/or support applications, of which a few possible components are described herein. It will be understood that activation server 200 may contain all or only a portion of the described components and may contain other components not specifically mentioned. The components shown may also be distributed across a number of nodes within the network. Each of the components is described in terms of its function, but it will be understood that the component is a combination of memory and processing power that is configured to perform the disclosed function. The memory will contain instructions provided in hardware, software, firmware, or any combination of the above. Processing power includes one or more processors. Each component may have its own discrete memory and/or processor or may share memory and the one or more processors with other components on the node.

Manager component 210 may be connected to a configuration database 212, which contains at least a list of authorized users. If the user is authorized for remote access from an MCD, configuration database 212 contains a mapping between the MCD and an email address for the user and also contains a copy of an encryption key used in communication with the associated MCD. Manager component 210 controls mobile access to the network by managing user accounts and device administration. Policy component 214 performs administrative services over the wireless network, such as providing rules that have been set by an administrator to the individual MCD and ensuring that these rules are in effect at the MCD before the device is allowed to complete activation. The administrative rules can include rules governing device security, settings for synchronizing data over the wireless network, and other configuration settings on associated MCDs. Policy component 214 also sends routing information and configuration information used by the available services to associated MCDs. During activation of an MCD, manager component 210 and policy component 214 may cooperatively manage the activation. When any type of data is sent to or from MCDs, dispatch component 216 provides compression and encryption for the data. Synchronizer component 218 is responsible for synchronizing data on the MCD with the user's data at other locations, such as a desktop computer, messaging server, application server, etc. over the wireless network. Messaging component 220 connects to messaging server 208 to provide messaging services, calendar management, address lookups, etc., and may work in concert with synchronizing component 218 to ensure synchronization between the MCD and any data associated with the activated services on the MCD. The data that will initially be provided to the MCD may be provided from the user's desktop computer, application servers 204 or a website that provides a service to the user. Finally, attachment component 222 may convert supported message attachments into a format that users can view on an MCD.

In one or more embodiments, activation server 200 includes components for performing a light weight activation of an MCD, e.g., manager component 210 and policy component 214. The components for performing a light weight activation of an MCD may comprise a component configured for sending an activation summary to the mobile communication device responsive to receiving an activation request from the mobile communication device. The activation summary comprises notification of a plurality of services that can be activated. The components for performing a light weight activation of an MCD further comprises a component, responsive to receiving an activation response that comprises selection of at least one service of the plurality of services, to download to the mobile communication device at least one of configuration information and routing information for the at least one service.

Figure 3:
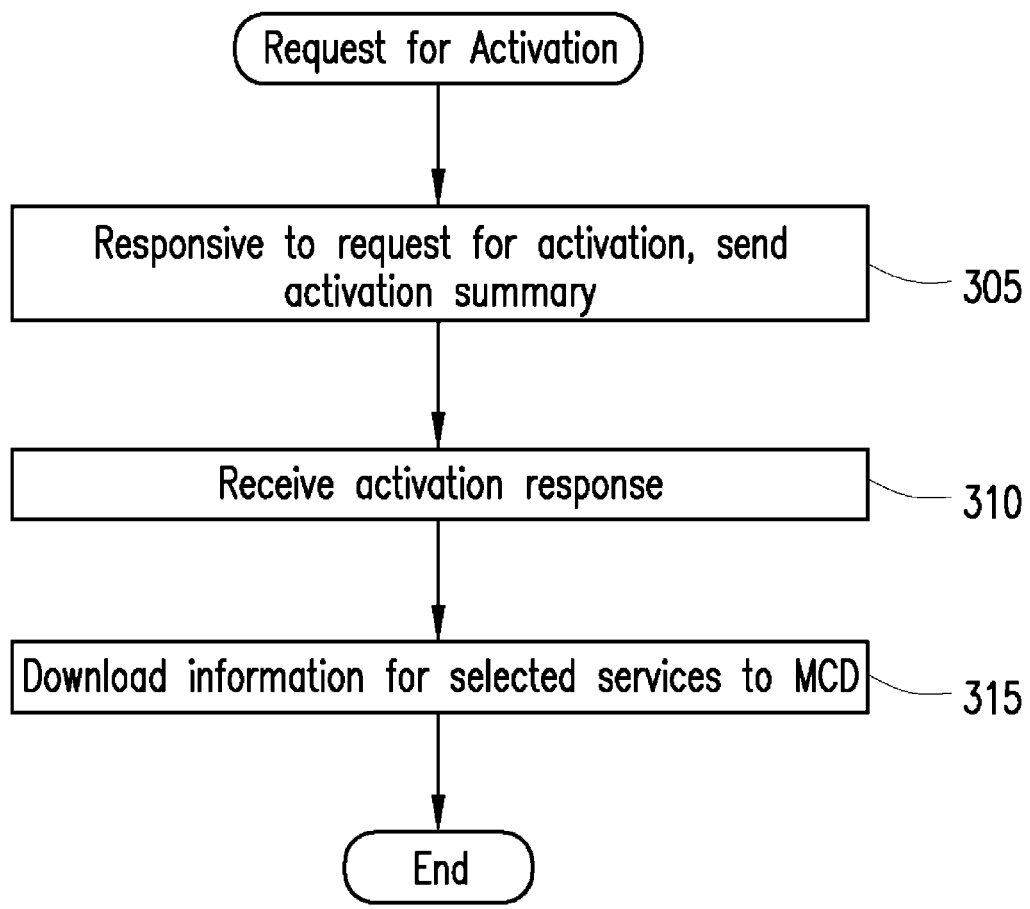
FIG. 3 depicts an example embodiment of a method for wirelessly activating a mobile communication device at an activation server.

Looking now at FIG. 3, a simplified embodiment of a method to activate a mobile communication device at an activation server is disclosed. The activation server may be an enterprise server, an ISP, an ASP, a server in a wireless communication network, or any similar network element that performs activation of a mobile communication device. The process starts when an activation request is sent to the activation server from the MCD. As will be discussed in a more specific example embodiment, an activation request generally includes a password that is provided to the user for initiating activation. Encryption techniques are also generally used to ensure privacy in the exchange of information between the MCD and the activation server. The use of a password and encryption is well known in the art and any variations in these techniques do not affect the light weight activation disclosed herein. Responsive to receiving the activation request, the activation server sends an activation summary comprising notification of a plurality of services that can be activated to the MCD (element 305). Responsive to sending the activation summary, the activation server receives an activation response in which at least one service of the plurality of services is selected (element 310). Responsive to receiving the activation response, the activation server downloads to the mobile communication device at least one of configuration and routing information for the at least one service (element 315).

Figure 4:
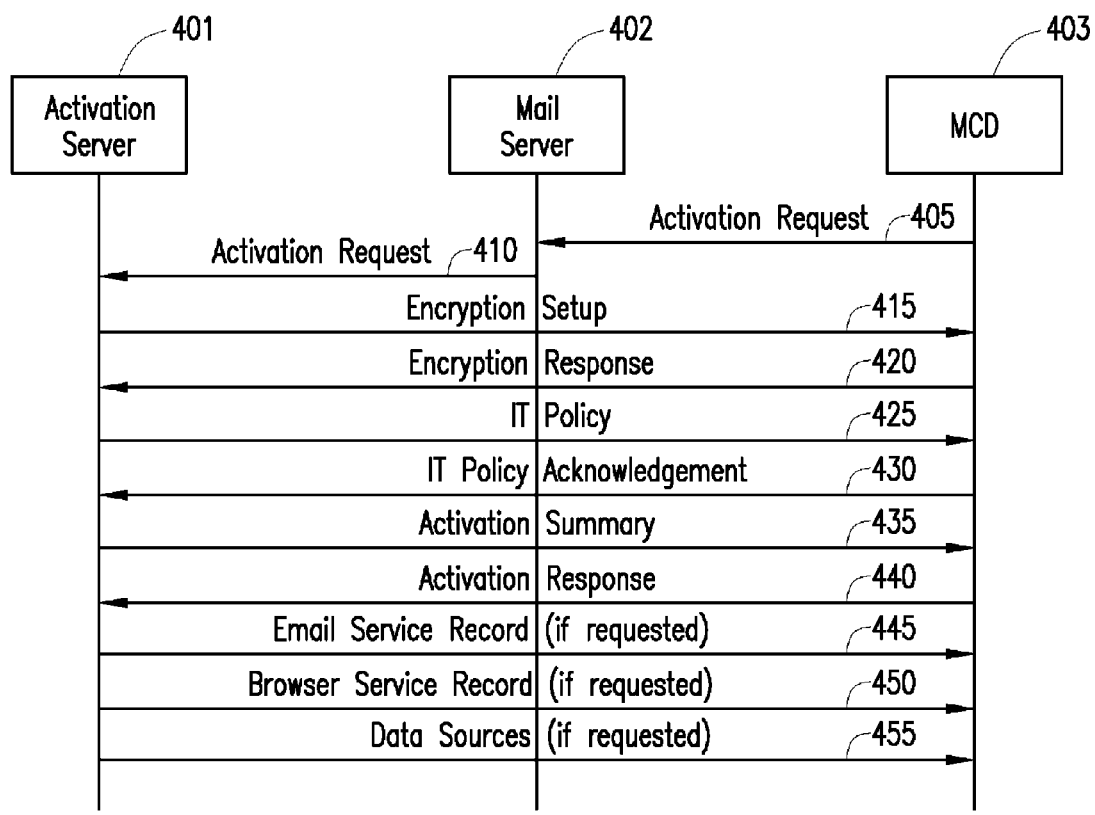
FIG. 4 depicts an example embodiment of a message exchange between an activation server and a mobile communication device wherein one or more embodiments of the present patent disclosure may be practiced.

With reference now to FIG. 4, an example high-level embodiment of a message exchange for light weight activation of a mobile communication device with a network through an activation server is disclosed. Prior to the message flow shown, the user of MCD 403 communicates the need to activate a new mobile communication device to an administrator associated with activation server 401, prompting the administrator to create an activation password that is stored at activation server 401 and communicated to the user. Alternatively, the activation password may be requested by the user via an automated system, or created by the user, and stored at activation server 401. The activation password is operable only with respect to the specific user's account. This password may be a temporary password that can be used to activate MCD 403 on the user's account within a given time frame. If MCD 403 is not activated within the given time frame, the temporary password may expire to lessen the risk of fraudulent activation of the MCD. In at least one embodiment, when the password is created, activation server 401 begins monitoring the associated user email account on mail server 402 for an activation request. In at least one embodiment, activation server 401 may monitor another contact point, e.g. an administrative email account or an instant message directed to the activation server.

When the user has possession of both MCD 403 and the password, the user triggers MCD 403 to request activation. In one embodiment, an activation screen is displayed the first time the MCD 403 is turned on. In another embodiment, the user navigates through a graphical user interface (GUI) to select an activation element. When the activation screen is displayed, the user enters an appropriate email account and the password and selects an appropriate GUI element to send this information. The MCD then sends an activation request containing the email account and password to the activation server. In the embodiment shown in FIG. 4, activation request 405 is sent as an email to the user's email account at the mail server. Since the activation server is monitoring the user's email account at the mail server, the activation request will be forwarded to the activation server via message 410. If the activation server is monitoring another contact point, the activation request is, of course, directed to the monitored contact point using an appropriate message format and the activation request may or may not need to be passed on by an intermediate node such as a mail server. Once the activation server receives the request for activation, the user account and password are validated. After validation, an encryption setup message 415 is sent to the MCD to initiate end-to-end encryption between the MCD and the activation server. The MCD sends an encryption response message 420 to the activation server. Although encryption setup message 415 and encryption response message 420 are shown as a single exchange, this process may take place over a series of messages exchanged between the two endpoints, as is known in the art. In at least one embodiment, the activation server then sends the information technology (IT) policy message 425 to the MCD. The IT policy includes rules that are imposed on the MCD as a requirement for activating wireless connectivity to the network, such as network 102. These rules may include device settings that affect security, data synchronization and other behaviors for an individual account or a group of user accounts. One such rule may be that the MCD must accept the provided IT policy before activation can proceed. In the embodiment of FIG. 4, IT policy acknowledgment message 430 is sent by the MCD before other information is provided to the MCD. Following acknowledgement message 430, activation server 401 sends an activation summary message 435 to MCD 403. The activation summary provides a list of those services that the user is authorized to activate, plus a list of the downloadable data associated with each service.

In at least one embodiment, the activation summary is a set of eXtended Markup Language (XML) records, although it will be understood that other languages and formats may be used to convey the activation summary. The XML records include a service record for each service that is provided, with a short description of the service, and a data source record for each set of downloadable data that is available. The activation summary may also contain information such as the amount of information that will be downloaded for each selection, an estimate of the time necessary for the download, etc. An example activation summary is shown below, providing for activation of two services, which in this example are for activation on a corporate network. The services provided in this example are 1) access to the user's email account on the corporate network and 2) the ability to wirelessly access other networks such as the Internet via the corporate network, referred to here as a corporate browser, and the two data sources or sets of downloadable data are 1) preloaded email messages, which are associated with the corporate mail account service, and 2) bookmarks, which are associated with access to the browser. One skilled in the art can modify these examples as necessary to fit other situations, such as the provision of these services at an ISP or ASP.

```
<EA Summary>
<Services>
<Name="Mail"   Description="Corporate   Mail   Account"
    ServiceID= "1"/>
<Name="Browsing"   Description="Corporate   Browsing"
    ServiceID="2"/>
</Services>
<DataSources>
<Name="Mail   Pre-Population"   Description="200   Msgs"
    ServiceID="1" SourceID="1"/>
<Name="Bookmarks"   Description="Bookmarks"   ServiceID="2"
    SourceID="2"/>
</DataSources>
</EA Summary>
```

In response to receiving the example activation summary, the MCD may display four icons representing the email service, the browser service, email messages and bookmarks. It is notable that for some users, pre-population of email may require 400 KB of data to be downloaded. Broadly speaking, a user's desire to accept all of the provided services and data will depend on the circumstances of the initialization. If the user has access to a high-speed, inexpensive route for receiving the downloaded services and data, such as a cable connection to the user's desktop computer or a high-speed WiFi connection, the user may desire to receive all of the selections in the initial download. However, if the user is, for example, traveling the user may only has access to a slower, more expensive cellular connection. In this situation, accepting all of the provided services and data may be more expensive, either in the time necessary for the download or the cost, than the user currently wants or needs. Once the user receives the activation summary, the user may select all of the displayed icons or a subset of the displayed icons. Permitting a user to activate only a portion of the authorized services and data sources provides a greater degree of flexibility for the user. The user may elect to activate only services or to activate only selected services and their associated data source(s). Since at this point the mobile communication device has been associated with the user and with an encryption key, the user can securely enable any remaining services and data sources on the MCD at a later time.

In at least one embodiment, a set of administrative rules may be applied to control aspects of the activation that may impact security or the inter-relationships between separate applications to be downloaded. An administrative rule may require that a core portion of the services be mandatory. For example, activation of email may be mandatory to enable future communication between the administrator and the user, although activation of other services and data sources may be optional. In another example, meeting scheduling typically requires email for the delivery of meeting notices, so that email activation may be required when a calendar application is activated. It will be understood that other types of rules may be applied to the activation process as necessary. The administrative rules may be implemented at the MCD, at the activation server or at both. Using the examples above, if activation of email is mandatory, the activation server may send the activation summary to the MCD with the email service pre-selected and not available for modification or the activation server may review returned selections for conformance to the rules, with error messages provided to the MCD. Alternately, the MCD may be provided with some portion of the rules for enforcement prior to returning a selection to the activation server. Similarly, when a calendar service is selected for activation, either the MCD or the activation server can monitor the activation selection message to ensure that the email service is also selected for activation.

Returning to FIG. 4, once the user has made a selection of services and data sources to activate, an activation response message 440 containing an indication of requested services and data sources is sent to the activation server. When the activation server receives the activation response message, necessary information for the requested service(s) and data source(s) are pushed to the MCD. As shown in this example, the activation server sends an email service record 445 containing the configuration and routing information for sending outgoing email to the associated mail server if email is requested or if required by the administrator. Likewise, the activation server sends a browser service record 450 containing configuration and routing information for providing browser access if this service is requested. Any requested data sources are also pushed to the MCD via message 455 at this time. The disclosed messages can be sent between the MCD and the activation server using common protocols such as TCP/IP, although the use of different protocols or message formats other than XML does not affect the disclosed light weight activation process. Once all required and requested elements have been pushed to the MCD, the activation process is complete.

Figure 5:
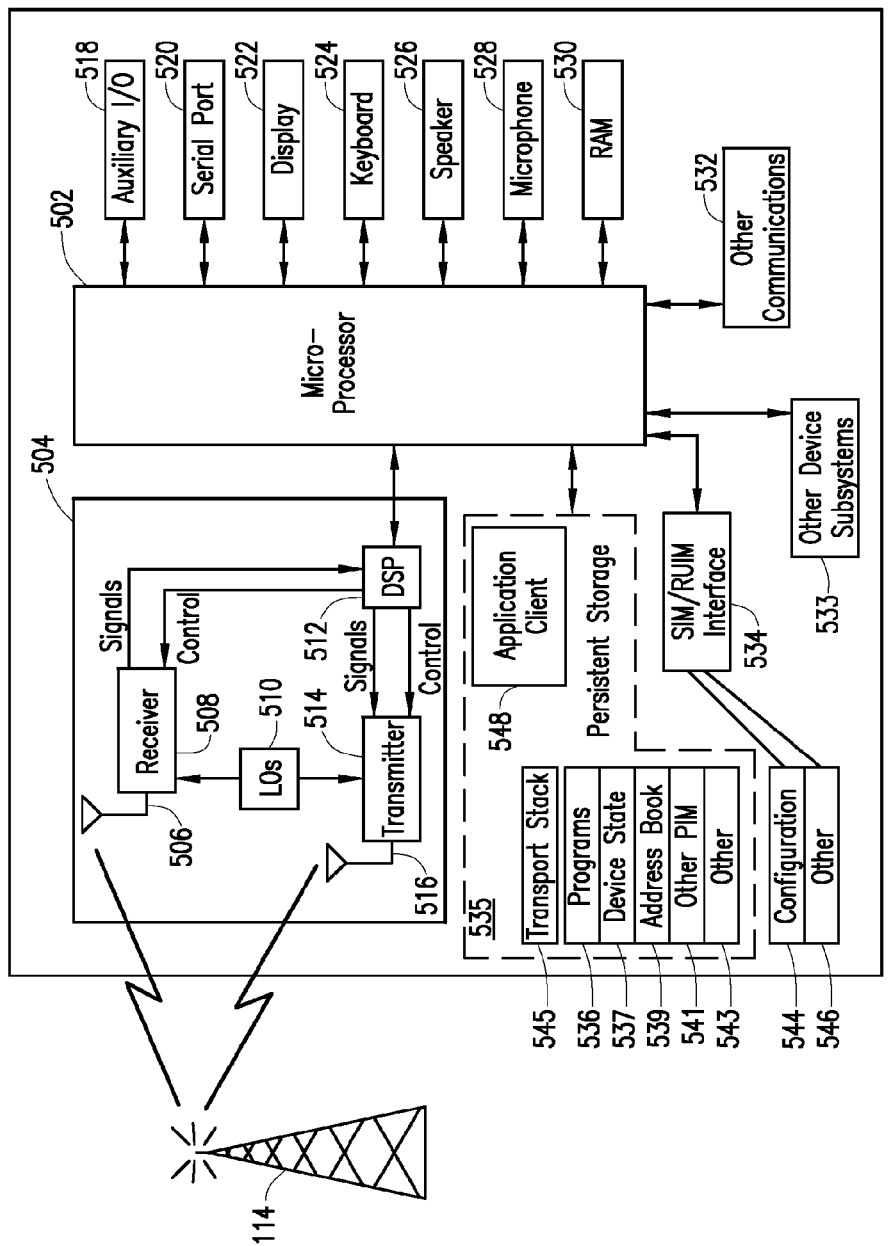
FIG. 5 depicts an example embodiment of a mobile communication device wherein one or more embodiments of the present patent disclosure may be practiced.

FIG. 5 depicts a block diagram of an example handheld device (e.g., MCD 116) according to one embodiment that includes appropriate functionality to engage in light weight activation of the MCD with an activation server as described hereinabove. A microprocessor 502 providing for the overall control of an embodiment of MCD 116 is operably coupled to a communication subsystem 504 which includes a receiver 508 and transmitter 514 as well as associated components such as one or more local oscillator (LO) modules 510 and a processing module such as a digital signal processor (DSP) 512. As will be apparent to those skilled in the field of communications, the particular design of the communication module 504 may be dependent upon the communications network with which the mobile device is intended to operate.

In one embodiment, the communication module 504 is operable with both voice and data communications. Regardless of the particular design, however, signals received by antenna 506 from a base station 507 are provided to receiver 508, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 512, and provided to transmitter 514 for digital-to-analog (D/A) conversion, frequency up conversion, filtering, amplification and transmission over the air-radio interface via antenna 516.

Microprocessor 502 also interfaces with further device subsystems such as auxiliary input/output (I/O) 518, serial port 520, display 522, keyboard 524, speaker 526, microphone 528, random access memory (RAM) 530, other communications facilities 532, which may include for example a short-range communications subsystem, and any other device subsystems generally labeled as reference numeral 533. To control access as well as supply the initial DM configuration, a Subscriber Identity Module (SIM) or Removable user Identity Module (RUIM) interface 534 is also provided in communication with the microprocessor 502. In one implementation, SIM/RUIM interface 534 is operable with a SIM/RUIM card having a number of key configurations 544 and other information 546 such as identification, DM configuration and subscriber-related data.

Operating system software and transport stack software may be embodied in a persistent storage module 535 (i.e., non-volatile storage) which may be implemented using Flash memory or another appropriate memory. In one implementation, persistent storage module 535 may be segregated into different areas, e.g., storage area for computer programs 536 (which may include operation system software) and transport stack 538, as well as data storage regions such as device state 537, address book 539, other personal information manager (PIM) data 541, and other data storage areas generally labeled as reference numeral 543. Additionally, an activation module 548 is provided for effectuating a light weight activation process with an activation server according to the teachings set forth hereinabove. The activation module 548 is also operable to provide the user a choice between the disclosed light weight activation or full activation, at the user's discretion.

Various processes, structures, components and functions set forth above in detail, associated with an activation server or a mobile communication device, may be embodied in software, firmware, hardware, or in any combination thereof. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

Accordingly, in one or more embodiments a computer-accessible medium may have a set of instructions that, when executed by an activation server, operate to wirelessly activate a mobile communication device. The computer-accessible medium comprises instructions for sending an activation summary to the mobile communication device responsive to receiving an activation request from the mobile communication device. The activation summary comprises notification of a plurality of services that can be activated on the mobile communication device. The computer-accessible medium includes instructions, responsive to sending the activation summary, for receiving an activation response in which at least one service of the plurality of services is selected and instructions, responsive to receiving the activation response, for downloading to the mobile communication device at least one of configuration and routing information for the at least one service.

Furthermore, it will be recognized by those skilled in the art upon reference hereto that the arrangements set forth in the Figures of the present application may comprise a number of variations and modifications, in hardware, software, firmware, or in any combination, usually in association with a processing system where needed, as components configured to perform specific functions. Accordingly, the arrangements of the Figures should be taken as illustrative rather than limiting with respect to the embodiments of the present patent application.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method operable at an activation server for wirelessly activating a mobile communication device, the method comprising:
   responsive to receiving an activation request from a mobile communication device, sending an activation summary that comprises notification of a plurality of services that the user is authorized to activate on the mobile communication device and of respective downloadable data items associated with each of the plurality of services; and
   responsive to receiving an activation response in which at least one service of the plurality of services is selected, downloading to the mobile communication device at least one of configuration information and routing information for the at least one service, wherein the given service is email service and the respective downloadable data items include synchronization of a number of emails with a user's email account.

2. The method as recited in claim 1, wherein the activation response does not include selection of the downloadable data items associated with email service.

3. The method as recited in claim 2, wherein the downloadable data items associated with email service are downloaded to the mobile communication device at a later time.

4. The method as recited in claim 1, wherein sending the activation summary further comprises sending a size associated with activation of each of the services.

5. The method as recited in claim 1, wherein sending the activation summary further comprises sending a size associated with activation of each of the respective downloadable data items.

6. The method as recited in claim 1, further comprising applying a set of administrative rules to the choices in the activation response prior to downloading the at least one service.

7. The method as recited in claim 6, further comprising sending an error message if a first service is selected for activation in the activation response but a second service, on which the first service is dependent, is not selected for activation.

8. The method as recited in claim 1, further comprising applying a set of administrative rules to the activation summary to make a first selection mandatory.

9. An activation server for wirelessly activating a mobile communication device, the activation server comprising:
   a component configured to send an activation summary to the mobile communication device responsive to receiving an activation request from the mobile communication device, the activation summary comprising notification of a plurality of services that the user is authorized to activate on the mobile communication device and of respective downloadable data items associated with each of the plurality of services; and
   a component configured to download to the mobile communication device at least one of configuration information and routing information for the at least one service, responsive to receiving an activation response that comprises selection of at least one service of the plurality of services, wherein the given service is email service and the respective downloadable data items include synchronization of a number of emails with a user's email account.

10. The activation server as recited in claim 9, wherein the activation response does not include selection of the downloadable data items associated with email service.

11. The activation server as recited in claim 9, wherein the component configured to download to the mobile communication device is further configured to download, at a later time, the downloadable data items associated with email service.

12. The activation server as recited in claim 9, wherein the component configured to send the activation summary sends a size associated with activation of each of the services and a size associated with activation of each of the data items.

13. The activation server as recited in claim 9, further comprising a component configured to apply a set of administrative rules to the activation response prior to performing the downloading.

14. The activation server as recited in claim 13, wherein the component configured to apply a set of administrative rules sends an error message if a first service is selected for activation in the activation response but a second service, on which the first service is dependent, is not selected for activation.

15. The activation server as recited in claim 13, further comprising a component configured to apply a set of administrative rules to the activation summary to make activation of a first service mandatory.

16. A non-transitory computer-accessible medium on which is stored a set of instructions that, when executed by an activation server, operate to wirelessly activate a mobile communication device, the computer-accessible medium comprising:
   instructions to send an activation summary to the mobile communication device responsive to receiving an activation request from the mobile communication device, the activation summary comprising notification of a plurality of services that the user is authorized to activate on the mobile communication device and of respective downloadable data items associated with each of the plurality of services;

instructions, responsive to receiving an activation response in which at least one service of the plurality of services is selected, to download to the mobile communication device at least one of configuration information and routing information for the at least one service, wherein the given service is email service and the respective downloadable data items include synchronization of a number of emails with a user's email account.

17. The non-transitory computer-accessible medium as recited in claim 16, further comprising instructions to download to the mobile communication device, at a later time, downloadable data items associated with the given service when the activation response does not include selection of the downloadable data items associated with email service.

18. The non-transitory computer-accessible medium as recited in claim 16, further comprising instructions to apply a set of administrative rules to the activation response prior to downloading any services to the mobile communication device.

19. The non-transitory computer-accessible medium as recited in claim 18, wherein the instructions to apply a set of administrative rules sends an error message if a first service is selected for activation in the activation response but a second service, on which the first service is dependent, is not selected for activation.

20. The non-transitory computer-accessible medium as recited in claim 16, further comprising instructions to apply a set of administrative rules to the activation summary to make activation of a first service mandatory.

\* \* \* \* \*